Patented June 26, 1928.

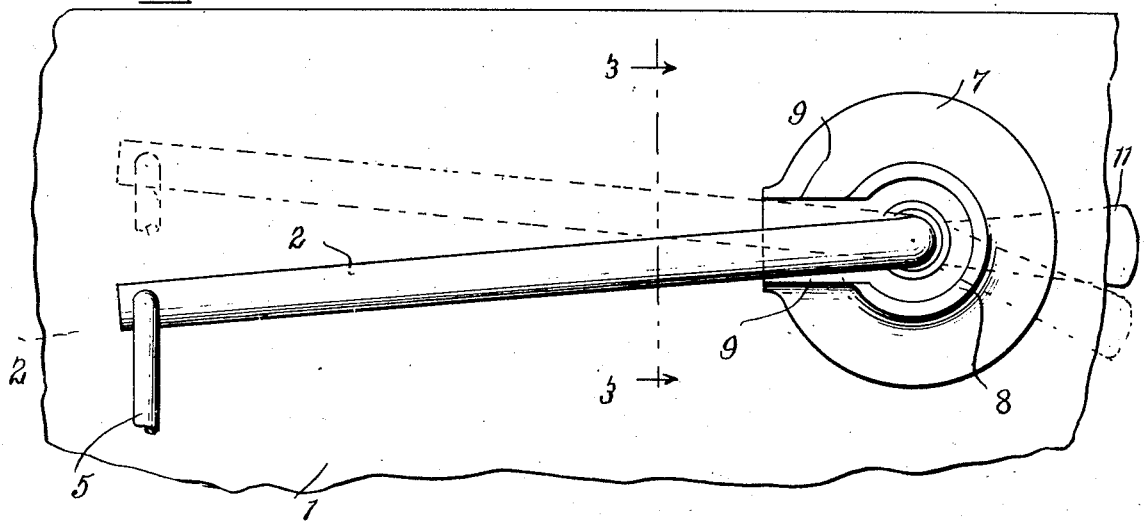
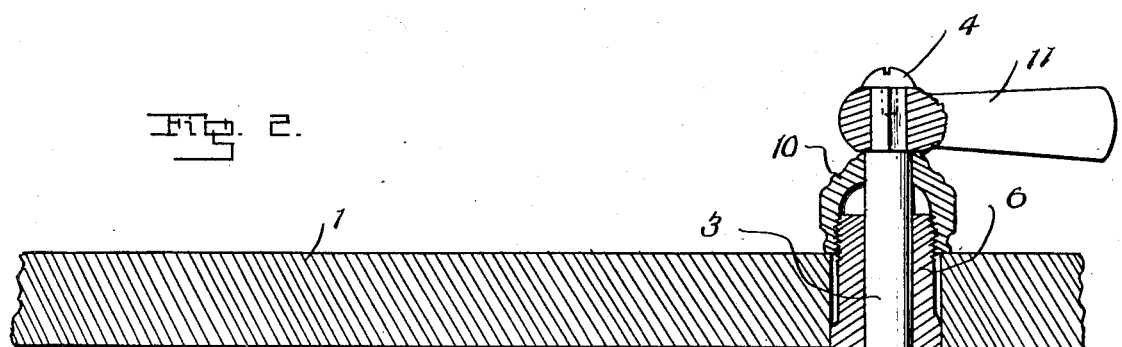
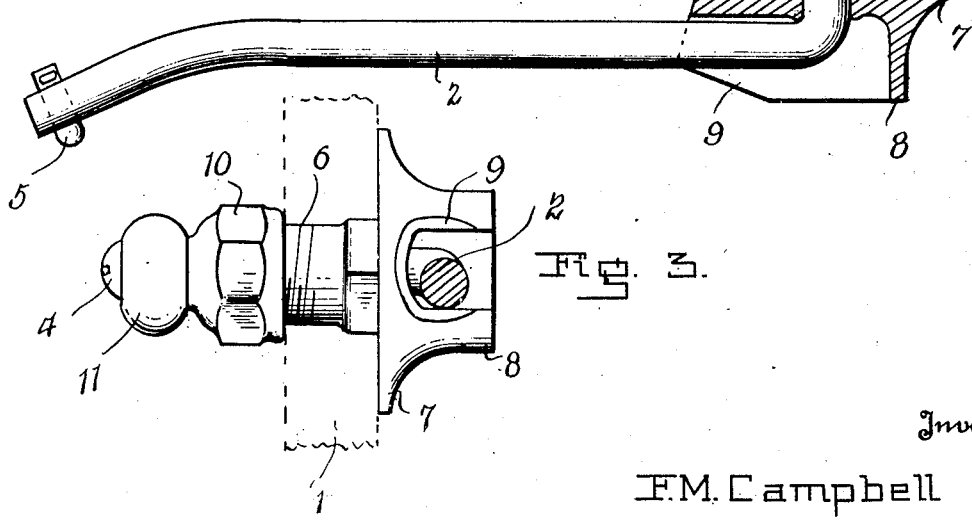

1,675,248

UNITED STATES PATENT OFFICE.

FRANK M. CAMPBELL, OF ASHEVILLE, NORTH CAROLINA.

FLUSH-VALVE LEVER AND MOUNTING.

Application filed July 15, 1927. Serial No. 206,092.

This invention relates to valve mechanism for flush tanks and aims to simplify the construction and reduce the number of parts to the fewest possible and provide an arrangement admitting of ready assemblage and dismemberment for repairs and other purposes.

The invention consists of a lever having an end portion bent to provide an integral spindle, a bearing for the spindle having a head including spaced stops to engage and limit the movements of the lever, a nut threaded upon the shank of the bearing, and a handle fitted to the projecting end of the spindle and removable therefrom to admit of the parts being easily separated when required.

While the drawing illustrates a preferred embodiment of the invention it is to be understood that in adapting the means to meet specific needs and requirements, the design may be varied and such other changes in the minor details of construction may be resorted to within the scope of the invention as claimed, without departing from the spirit thereof.

For a full understanding of the invention and the merits thereof, reference is to be had to the following description and the drawing hereto attached, in which,—

Figure 1 is a side view of a flush tank lever and mounting embodying the invention, a portion of the tank being shown and the full lines indicating the position of the lever when the valve is closed, and the dotted lines designating the position of the lever when the valve is unseated.

Figure 2 is a detail sectional view on the line 2—2 of Figure 1, the lever being in full lines.

Figure 3 is a detail sectional view on the line 3—3 of Figure 1, looking in the direction of the arrows.

Corresponding and like parts are referred to in the following description and designated in the several views of the drawing by like reference characters.

The numeral 1 designates a portion of the side of a flush tank to which the operating lever of the valve mechanism is mounted. The lever 2 has an end portion bent substantially at a right angle to form a spindle 3, the end of which is of polygonal form and provided with a threaded opening to receive a screw 4. The free end of the lever 2 is deflected laterally, as indicated most clearly in Figure 2 of the drawings, and is apertured to receive the stem 5 of the usual flush valve, not shown. The lever and spindle are formed from a stout rod which has an end portion bent laterally to form the spindle.

A bearing member constituting the mount for the lever consists of a tubular shank 6 which is externally screw-threaded, and a head comprising a base 7 and an offstanding flange comprising a circular portion 8 and spaced portions 9. The opening through the shank 6 snugly receives the spindle 3. The tubular shank 6 passes through an opening formed in a side wall of the tank 1 and a portion is of polygonal outline to snugly fit a corresponding portion of the opening formed in the tank to prevent any possible turning of the bearing member when properly positioned. The bearing member is arranged with the base 7 in engagement with the inner side of the tank and the tubular shank is of a length to project beyond the outer side of the tank to receive a clamp nut 10, between which and the base 7 the side wall of the tank is clamped. The spindle 3 obtains a snug fit in the clamp nut 10 and the end portion projecting beyond the clamp nut is square and fits snugly within an opening of corresponding shape formed in the upper end of a handle 11, displacement of said handle being prevented by means of the screw 4 which is threaded into an opening formed in the projecting end of the spindle.

When the parts are assembled the handle 11 extends in an opposite direction to the lever 2 and both the lever and handle are disposed horizontally. The lever normally rests upon the bottom flange 9. When the outer end of the handle 11 is depressed the free end of the lever 2 is elevated to unseat the valve in a manner well understood, the upward movement of the lever being limited by the upper flange 9. The parts may be cheaply manufactured and readily assembled, and may be easily dismembered to admit of repairs or for other purposes.

Having thus described the invention, I claim:

1. In combination with a flush tank lever having a spindle, of a bearing member therefor comprising a tubular shank adapted to pass through an opening formed in a side of the tank, and a head at the inner end of the shank comprising a base to engage the inner side of the tank, and spaced elements to limit the movement of the lever, means to retain the bearing in place, and a handle secured to the projecting end of the spindle and serving as means to hold it and the lever in place.

2. In combination with a flush tank lever having a spindle, the outer end of which is of non-circular form and provided with an axial opening interiorly threaded, of a bearing member comprising a threaded tubular shank having a head at one end and passing through an opening in a side of the tank with the head engaging the inner side of the tank and comprising a base and spaced flanges, a clamp nut threaded to the projecting threaded end of the shank, and receiving the spindle, a handle fitted to the non-circular end of the spindle and a screw threaded into the opening in the end of the spindle and serving to retain the handle in place.

3. A flush tank lever having a spindle provided with a non-circular end in which is formed a threaded opening, a bearing member receiving the spindle and comprising a tubular shank having a head at one end comprising a base, and an offstanding flange comprising a circular portion and spaced portions, a clamp nut threaded upon the projecting end of the shank, a handle fitted to the non-circular end of the spindle, and a screw threaded into the opening of the spindle and serving to hold the handle in place.

4. A flush tank lever consisting of a rod having an end portion bent to provide a spindle, the outer end of which is of non-circular form and provided with an axial opening interiorly threaded, a bearing member comprising an externally threaded tubular shank having a head at one end, including a base, and an offstanding flange comprising a circular and spaced portions, a clamp nut threaded to the projecting end of the shank, a handle fitted upon the non-circular end of the spindle and a screw threaded into the opening of the spindle and serving to hold the handle in place thereon.

5. In a flush tank, a bearing having a shank and a head at one end thereof, the shank being formed with an axial bore and the head having a recess leading from the bore and opening through one side of the head, the side walls of the recess defining spaced stop shoulders, means for securing the bearing to a wall of the tank, a lever having an angularly disposed spindle rotatably received in the bore, said lever extending through the recess and adapted to contact with the stop shoulders to limit swinging movement of the lever, and an actuating handle connected with the opposite end of the spindle to rotate said spindle and impart swinging movement to the lever.

In testimony whereof I affix my signature.

FRANK M. CAMPBELL. [L. S.]